US008043983B2

(12) United States Patent
Iwaki et al.

(10) Patent No.: US 8,043,983 B2
(45) Date of Patent: Oct. 25, 2011

(54) FLAME-RETARDANT METAL-COATED CLOTH

(75) Inventors: Terufumi Iwaki, Kyoto (JP); Katsuo Sasa, Kyoto (JP); Sachiyo Sakagawa, Fukui (JP); Toru Takegawa, Fukui (JP)

(73) Assignees: Daikyo Chemical Co., Ltd., Kyoto-shi (JP); Seiren Co., Ltd., Fukui-shi (JP)

( * ) Notice: Subject to any disclaimer, the term of this patent is extended or adjusted under 35 U.S.C. 154(b) by 265 days.

(21) Appl. No.: 11/035,888

(22) Filed: Jan. 14, 2005

(65) Prior Publication Data

US 2005/0159061 A1 Jul. 21, 2005

(30) Foreign Application Priority Data

Jan. 16, 2004 (JP) ................................ 2004-009277

(51) Int. Cl.
*B32B 27/04* (2006.01)
*B32B 5/02* (2006.01)

(52) U.S. Cl. ........ 442/136; 442/141; 442/142; 442/147; 428/920; 428/921

(58) Field of Classification Search .................. 442/136, 442/141, 142, 143, 147; 428/920, 921
See application file for complete search history.

(56) References Cited

U.S. PATENT DOCUMENTS

| | | | | |
|---|---|---|---|---|
| 3,759,851 | A * | 9/1973 | Carl et al. | 442/139 |
| 6,569,912 | B1 * | 5/2003 | Oohara et al. | 521/79 |
| 6,596,893 | B2 * | 7/2003 | Nakacho et al. | 558/157 |
| 7,935,405 | B2 * | 5/2011 | Sakagawa et al. | 428/66.4 |
| 2002/0016119 | A1 * | 2/2002 | Orita et al. | 442/307 |
| 2003/0162870 | A1 | 8/2003 | Kimura et al. | |

FOREIGN PATENT DOCUMENTS

| | | | |
|---|---|---|---|
| CN | 1242784 | | 1/2000 |
| JP | 62-21870 | A | 1/1987 |
| JP | 7-42079 | | 2/1995 |
| JP | 2000-160164 | | 6/2000 |
| JP | 2003-247164 | | 9/2003 |
| TW | 570944 | B | 1/2004 |
| WO | WO 99/19383 | * | 4/1999 |

OTHER PUBLICATIONS

Chinese Office Action dated Jan. 4, 2008 of CN 2005100043722.
European Search Report dated Dec. 7, 2005 of EP 05250010.
Taiwan Office Action dated Feb. 9, 2010, issued in corresponding Taiwan Patent Application No. 093141443 (With English Translation).

* cited by examiner

*Primary Examiner* — Matthew Matzek
(74) *Attorney, Agent, or Firm* — Westerman, Hattori, Daniels & Adrian, LLP

(57) ABSTRACT

A flame-retardant metal-coated cloth having a high degree of flame retardancy and a soft feeling without the use of any halogen compound or antimony compound is provided. In the flame-retardant metal-coated cloth, a flame-retardant film comprising a mixture (E) of a phosphorus compound (A), a metal hydroxide (B), a phosphoric ester (C), and a thermoplastic resin (D), is formed on at least one surface of a metal-coated cloth, and the ratio of (A):(B):(C):(D) is 20 to 200:100 to 950:10 to 250:100 in terms of a weight ratio.

11 Claims, No Drawings

FLAME-RETARDANT METAL-COATED CLOTH

FIELD OF THE INVENTION

The present invention relates to a metal-coated cloth to be used as an electromagnetic wave shielding material for shielding electromagnetic waves generated from electronic devices and as a measure against static electricity.

BACKGROUND OF THE INVENTION

With the recent rapid spread of electronic devices in various fields, including homes and offices, an electromagnetic interference such that an electromagnetic wave leaking from a certain electronic device causes malfunction of another electronic device, is now posing a problem. To prevent such an inconvenience, various electromagnetic wave shielding materials are in use.

Moreover, under the Product Liability Law (PL Law), not only electronic devices but also electromagnetic wave shielding materials are required to be flame-retardant. Above all, a demand for such flame retardancy as satisfies FMVSS Standard and UL Standard is strong.

As an example of an electromagnetic wave shielding material, mention may be made of fiber cloths having metal-coated fiber surfaces. In many of those fiber cloths, the coating metals serve as oxidation catalysts and enhance the combustibility. This is presumed to be because not only the metal coatings obstructs a fire extinguishing action induced by melting of fibers but also the thermal conductivity of fibers is improved and promotes the spread of fire. Various studies have been made for improving the flame retardancy of such metal-coated fiber cloths.

In JP 62-21870A there is disclosed a metal-deposited flameproofing fiber wherein a phosphorus compound-based antiflaming agent and a halogen compound-based antiflaming agent are applied in combination to a metal-deposited fiber to improve the flameproofness synergistically. In recent years, however, attention has been paid to the relation between halogen compounds and dioxins. The structures of halogen compounds-based antiflaming agents are closely similar to the structures of dioxins, and it is said that if halogen compounds are burned together with such metal elements as copper and iron at temperatures in the range from 300 to 600° C., dioxins may be produced, and even if they are burned and decomposed at a temperature of 800° C. or higher for the purpose of perfect combustion, dioxins are produced as the temperature drops. In these points, i.e., from the standpoint of environmental pollution, the use of halogen compounds-based antiflaming agents is not preferable.

In JP 7-42079A it is disclosed that the surface of a metal-coated fiber cloth is coated with a urethane resin, then the surface of the urethane resin is coated with a mixture of an organic compound antiflaming agent such as an organophosphorus compound and an inorganic compound antiflaming aid such as an antimony compound, and further the surface of the mixture is coated with a urethane resin, to afford a metal-coated fiber cloth having flameproofness and a rust preventing effect. However, the antimony compound used as the antiflaming aid is poisonous to the human body and is therefore not desirable.

Thus, attention has recently been paid to safety for the environment and the human body, and in order to meet such safety, the development of a flame-retardant metal-coated cloth not using a halogen compound or an antimony compound is desired.

For example, the use of magnesium hydroxide and aluminium hydroxide as a substitute for the halogen compound and the antimony compound has been proposed. However, even if these compounds are applied each alone to cloth, a satisfactory flame retardancy is not obtained, and if they are each used in a large quantity for improving the flame retardancy, the feeling of the cloth becomes hard.

The use of phosphorus compounds such as red phosphorus and phosphoric esters has also been proposed. However, red phosphorus produces phosphine and thus involves the problem of toxicity, and phosphoric esters are generally low in phosphorus content and do not afford a satisfactory flame retardancy.

SUMMARY OF THE INVENTION

The present invention has been accomplished in view of the above-mentioned circumstances and it is an object of the invention to provide a flame-retardant metal-coated cloth having a high degree of flame retardancy and a soft feeling, using neither a halogen compound nor an antimony compound.

Having made earnest studies for solving the above-mentioned problems, the present inventors found out that a metal-coated cloth having a high degree of flame retardancy and a soft feeling could be obtained by forming a flame-retardant film on at least one surface of a metal-coated cloth, the flame-retardant film being formed from a mixture comprising a phosphorus compound, a metal hydroxide, a phosphoric ester, and a thermoplastic resin, at a specific ratio.

More specifically, the present invention resides in a flame-retardant metal-coated cloth characterized in that a flame-retardant film comprising a mixture (E) of a phosphorus compound (A), a metal hydroxide (B), a phosphoric ester (C), and a thermoplastic resin (D), is formed on at least one surface of a metal-coated cloth, the ratio of (A):(B):(C):(D) being 20 to 200:100 to 950:10 to 250:100 in terms of a weight ratio.

EFFECT OF THE INVENTION

According to the present invention it is possible to provide a metal-coated cloth having both high flame retardancy and soft feeling. The flame-retardant metal-coated cloth of the present invention does not contain any antimony compound that is harmful to the human body, nor does it produce poisonous halogen gases such as dioxins in the event of combustion. Since the flame-retardant metal-coated cloth of the present invention is endowed with flame retardancy without greatly impairing the softness inherent in the cloth, the electric conductivity inherent in the metal and the electromagnetic wave shielding property inherent in the metal-coated cloth, it is employable suitably as an electromagnetic wave shielding material.

DETAILED DESCRIPTION OF PREFERRED EMBODIMENTS

The present invention will be described in more detail hereinunder.

The cloth used in the present invention may be in any of woven, knitted, and nonwoven forms, with no special limitation placed on its form. As examples of employable fibers, mention may be made of synthetic fibers such as polyester-based fibers (e.g., polyethylene terephthalate and polybutylene terephthalate), polyamide-based fibers (e.g., nylon 6 and nylon 66), polyolefin-based fibers (e.g., polyethylene and polypropylene), polyacrylonitrile-based fibers, polyvinyl alcohol-based fibers, and polyurethane-based fibers, semi-synthetic fibers such as cellulose-based fibers (e.g., di- and triacetates) and protein-based fibers (e.g., promix), regenerated fibers such as cellulose-based fibers (e.g., rayon and cupro) and protein-based fibers (e.g., casein), and natural fibers such as cellulose-based fibers (e.g., cotton and hemp) and protein-based fibers (e.g., wool and silk). These fibers may be used each alone or in combination of two or more. When processability and durability are taken into account, synthetic fibers are preferred. Above all, polyester fibers are preferred. From the standpoint of safety, it is preferable to select fibers not containing any of halogen compounds, antimony compounds and red phosphorus.

For coating a metal onto the fiber surfaces of the cloth produced by using any of the above fibers, there may be adopted a known method such as, for example, vapor deposition, sputtering, electroplating, or electroless plating. Above all, when the uniformity of the formed metal film and the productivity are taken into account, it is preferable to adopt electroless plating or a combination of both electroless plating and electroplating. For ensuring the fixing of metal, it is preferable that impurities, including size (paste), oil and dust, adhered to fiber surfaces be completely removed beforehand by scouring.

How to effect scouring is not specially limited. There may be adopted a known scouring method.

As examples of employable metals, mention may be made of gold, silver, copper, zinc, nickel, and alloys thereof. When electric conductivity and production cost are taken into account, copper and nickel are preferred. It is preferable that one or two coating layers be formed by any of these metals. Three or more coating layers are not preferable because not only the metal coating thickness becomes large and the feeling of cloth becomes hard but also the production cost increases. In case of laminating two metal coating layers, it is optional whether two layers are to be formed by laminating the same kind of metal or different kinds of metals. This point may be determined taking the required electromagnetic wave shielding property and durability into account.

The flame-retardant metal-coated cloth of the present invention comprises the metal-coated cloth described above and a flame-retardant film formed on at least one surface of the metal-coated cloth, the flame-retardant film being formed by a mixture (E), the mixture (E) comprising a phosphorus compound (A), a metal hydroxide (B), a phosphoric ester (C), and a thermoplastic resin (D), at a specific ratio. By the term film is meant the very film or a sheet-like coating.

The phosphorus compound (A) used in the present invention may be a known compound employable as a flame retardant. Particularly, a preferred phosphorus compound is one containing phosphorus and nitrogen as constituent elements, having a phosphorus content of 10 to 15 wt %, especially 12 to 14 wt %, and having a phosphorus to nitrogen content ratio (phosphorus:nitrogen) of 1:0.3 to 4, especially 0.4 to 3.5.

If the phosphorus content is less than 10 wt %, the phosphorus compound used is less effective as a flame retardant and the use of a larger amount of the phosphorus compound is required for imparting sufficient flame retardancy to the metal-coated cloth. This is uneconomical. If the phosphorus content exceeds 15 wt % (as examples of phosphorus compounds containing such a high content of phosphorus there are mentioned amidophosphazene and ammonium polyphosphate), the metal coating in the metal-coated cloth is usually corroded and there is a fear that the electric conductivity and electromagnetic wave shielding property may be deteriorated with the lapse of time.

If the nitrogen content of a phosphorus compound used is less than 0.3 relative to 1.0 of phosphorus, a char layer formed in the event of combustion becomes fragile and hence it becomes difficult to prevent the spread of fire. If the nitrogen content exceeds 4.0 relative to 1.0 of phosphorus, the flame retardant becomes less effective and the use of a larger amount of the phosphorus compound is needed for imparting sufficient flame retardancy to the metal-coated cloth. This is uneconomical.

As examples of the phosphorus compound (A), mention may be made of reactive group-free, internal mixing type phosphazene compounds and melamine polyphosphates. These may be used each alone or in combination of two or more. As an internal mixing type phosphazene compound it is preferable to use a cyclic or straight-chained phenoxyphosphazene.

It is required that the proportion of the phosphorus compound (A) be 20 to 200 parts by weight, more preferably 30 to 150 parts by weight, based on 100 parts by weight of the thermoplastic resin (D). If the proportion of the phosphorus compound (A) is less than 20 parts by weight based on 100 parts by weight of the thermoplastic resin (D), it is impossible to impart sufficient flame retardancy to the metal-coated cloth, while if exceeds 200 parts by weight, there will occur inconveniences such as bleeding-out of the phosphorus compound or the feeling becoming hard.

In the present invention, the metal hydroxide (B) is used from the standpoint of cooling a burning site in the event of combustion of the metal-coated cloth. As examples of the metal hydroxide (B) used for such a purpose there are mentioned aluminium hydroxide and magnesium hydroxide. These may be used each alone or in combination of two or more. Particularly, aluminium hydroxide, which is large in endothermic quantity, is preferred.

It is required that the proportion of the metal hydroxide (B) be 100 to 950 parts by weight, more preferably 100 to 400 parts by weight, based on 100 parts by weight of the thermoplastic resin (D). If the proportion of the metal hydroxide (B) is less than 100 parts by weight based on 100 parts by weight of the thermoplastic resin (D), it is impossible to impart sufficient flame retardancy to the metal-coated cloth, and if the proportion of the metal hydroxide (B) exceed 950 parts by weight, the adhesion between the flame-retardant film formed by the mixture (E) and the metal-coated cloth is deteriorated or the feeling becomes hard.

In the present invention, the phosphoric ester (C) is used mainly for the purpose of plasticizing the flame-retardant film formed by the mixture (E). Although the phosphoric ester (C) used for such a purpose is not specially limited, orthophosphoric esters are much preferred in view of plasticizing properties and non-corrosiveness to the formed metal film. As examples thereof, mention may be made of known orthophosphoric esters such as trimethyl phosphate, triethyl phosphate, tributyl phosphate, tri-2-ethylhexyl phosphate, triphenyl phosphate, tricresyl phosphate, trixylenyl phosphate, cresyl diphenyl phosphate, xylenyl diphenyl phosphate, resorcinol bis(diphenyl phosphate), and bisphenol A bis (diphenyl phosphate). These compounds may be used each alone or in combination of two or more.

It is required that the proportion of the phosphoric ester (C) be 10 to 250 parts by weight, preferably 10 to 100 parts by weight, based on 100 parts by weight of the thermoplastic resin (D). If the proportion of the phosphoric ester (C) is less than 10 parts by weight based on 100 parts by weight of the thermoplastic resin (D), the plasticizing effect will be unsatisfactory and there is a fear that the feeling may become hard. If the proportion of the phosphoric ester exceeds 250 parts by weight, the phosphoric ester may bleed out, or the flame-retardant film may become sticky when formed from the mixture (E).

In the present invention, the thermoplastic resin (D) is used for the purpose of fixing the phosphorus compound (A), metal hydroxide (B) and phosphoric ester (C) to the metal-coated cloth, i.e., it is used as a binder resin. As examples of the thermoplastic resin (D) used for such a purpose, mention may be made of ester type-, ether type- and carbonate type-urethane resins, acrylic resins such as polymethylmethacrylate, polyethylmethacrylate, polyethylacrylate and polybutylacrylate, polyester resins such as polyethyleneterephthalate, polybutyleneterephthalate, polvethylenenaphthalate-isophthalate copolymer and the like. These resins may be used each alone or in combination of two or more. When flexibility is taken into account, urethane resin and acrylic resin are preferred, with urethane resin being more preferred. Urethane resin is difficult to impair retardancy and the feeling thereof is soft and is therefore particularly preferred in the present invention.

For the purpose of coloring, adjusting the feeling, imparting a functional property such as an insulating property, or further improvement of flame retardancy, other additives may be incorporated in the mixture (E) insofar as they do not impair the performance of the mixture. As examples of such additives, mention may be made of elastomers such as silicone rubber, olefinic copolymers, modified nitrile rubber, and modified polybutadiene rubber, flame-retarding aids such as expansible graphite, melamine, and melamine cyanurate, pigments such as titanium dioxide, and dispersants such as polyether type polymers and polycarboxylic acid polymers.

As to the phosphorus compound (A), metal hydroxide (B), phosphoric ester (C), thermoplastic resin (D) and additive used in the present invention, those available commercially may be used without any limitation. For example, the thermoplastic resin (D) is on the market in a dissolved state within an organic solvent and is available easily.

The flame-retardant metal-coated cloth of the present invention can be produced by coating a metal-coated cloth with a mixed treating solution to form a flame-retardant film of the mixture (E) on the metal-coated cloth, the mixed treating solution containing, as essential components, the foregoing phosphorus compound (A), metal hydroxide (B), phosphoric ester (C), and thermoplastic resin (D), at a specific ratio.

As a solvent for dissolving or dispersing various raw materials used there may be used an organic solvent such as benzene, toluene, xylene, methyl ethyl ketone, or dimethyl formamide. Mineral oil fractions such as industrial gasoline, petroleum naphtha, and terpene, are also employable. These solvents may be used each alone or in combination of two or more.

The solvent used is added in an appropriate amount so that the viscosity of the mixed treating solution becomes 3000 to 25000 cps, preferably 8000 to 20000 cps. If the viscosity of the mixed treating solution is lower than 3000 cps, there is a fear that the mixed treating solution may leak back to the opposite side of the metal-coated cloth and impair the appearance grade. If the amount of the solvent used exceeds 25000 cps, the coatability will be deteriorated.

For preparing the mixed treating solution there may be adopted any method insofar as various raw materials used can be dispersed and mixed uniformly. As examples of methods usually adopted, mention may be made of a method wherein dispersion and mixing are performed by agitation using a propeller and a method wherein dispersion and mixing are performed by kneading with use of a kneader or a roller.

As a coating method there may be adopted a conventional method using a knife coater, a roll coater, or a slit coater. A laminating method or a bonding method is also adoptable. After the mixed treating solution is applied to the metal-coated cloth, the solvent is removed by drying for example to form a flame-retardant film.

The amount of the mixed treating solution to be applied to the metal-coated cloth is preferably 100 to 300 wt %, more preferably 150 to 250 wt %, based on the weight of the flame-retardant film of the mixture (E). If the amount in question is less than 100 wt %, a high degree of flame retardancy may not be obtained, and if it exceeds 300 wt %, not only the flexibility inherent in the cloth is lost, but also a further improvement of flame retardancy cannot be expected.

For the purpose of preventing the back leakage of the mixed treating solution, a sealing resin such as an acrylic resin, a polyurethane resin, or a polyester resin, may be applied beforehand to the metal-coated cloth. Usually, the sealing resin is applied so as to fill up gaps between the metal-coated fibers. A pigment may be added to the sealing resin for the purpose of coloring, or a flame retardant may be added for the purpose of a further improvement of flame retardancy. In this case, it goes without saying that a flame retardant other then halogen compounds and antimony compounds should be selected. It is optional whether the surface to which a sealing solution consisting principally of a sealing resin is applied is to be the same surface as the surface to be coated with the mixed treating solution for formation of the flame-retardant film or is to be the opposite surface. In case of coating on the same surface, if the same type of a resin as the thermoplastic resin (D) is used, it is possible to expect not only the sealing effect but also the effect of improving the adhesion between the flame-retardant film and the metal-coated cloth. On the other hand, in case of coating on the opposite surface, if there is used a resin capable of affording a high film strength, it is possible to expect not only the sealing effect but also the effect of protecting the surface of the metal-coated cloth and the effect of improving the adhesion to an adhesive tape used for mounting to an electronic device.

In this way the flame-retardant metal-coated cloth of the present invention can be obtained. The flame-retardant film of the mixture (E) may be formed not only on one surface alone but also on both surfaces of the cloth. After formation of the flame-retardant film, there may be performed a treatment for imparting any other function to the coated cloth or such a special treatment as calendering.

The thickness of the flame-retardant metal-coated cloth of the present invention is preferably 50 to 500 μm, more preferably 100 to 300 μm. If the thickness is less than 50 μm, the strength of the cloth may be deteriorated, and if it exceeds 500 μm, the cloth will become less flexible and hence difficult to handle.

EXAMPLES

The present invention will be described in more detail hereinunder by way of working Examples thereof, but it is to be understood that the present invention is not limited at all by the following Examples. In the following Examples, "part" and "%" are on weight basis. Flame-retardant metal-coated cloths obtained in the following Examples were evaluated by the following methods.

(1) Flame Retardancy

Evaluated in accordance with UL94 Method, VTM-0 Testing Method.

(2) Rigidity/Softness

Evaluated in accordance with JIS L 1096 A Method (45° Cantilever Method). The smaller the numerical value, the softer the feeling.

(3) Surface Conductivity

The flame-retardant film-free surface was measured for resistance value with use of a resistance value measuring device of Loresta-EP MCP-T360 ESP type (a product of Mitsubishi Chemical Co.).

(4) Electromagnetic Wave Shielding Property

Attenuation of electromagnetic waves in the frequency range of 10 MHz to 1 GHz was measured in accordance with KEC Method established by Kansai Electronic Industry Promotion Center and with use of a spectrum analyzer HP8591EM with a tracking generator (a product of HEWLETT PACKARD JAPAN COMPANY).

(5) Bonding Strength Between the Flame-Retardant Film and the Metal-Coated Cloth A hot melt adhesive tape (MELCO tape BW-II 25 mm RB, a product of Sun Chemical Co.) was affixed to a surface of the flame-retardant film using a home iron and under the conditions of 150° C., 5 seconds. After left standing at room temperature for 30 minutes, 180° peeling strength was measured at a pulling rate of 100 mm/min with use of a tension-compression tester (SV-55C-20H, a product of Imada Mfg. Co.).

(6) Bonding Strength Between an Adhesive Tape and the Flame-Retardant Metal-Coated Cloth A double-coated adhesive tape (No. 5011N, a product of Nitto Denko Corp.) was affixed to the flame-retardant film-free surface and brought into close contact with the surface by reciprocating once a roller having a width of 25 mm and a weight of 2 kg. After left standing at room temperature for 30 minutes, 180° peeling strength was measured at a pulling rate of 100 mm/min with use of a tension-compression tester (SV-55C-20H, a product of Imada Mfg. Co.).

(7) Thickness

Measured using a thickness measuring device (a product of Techlock Co.).

Example 1

A polyester fiber cloth (woven:warp 56 dtex/36 f, weft 56 dtex/36 f, warp density 158 pc/in, weft density 95 pc/in) was subjected to scouring, drying, and heat treatment, then was dipped in an aqueous solution containing 0.3 g/L of palladium chloride, 30 g/L of stannous chloride, and 300 ml/L of 36% hydrochloric acid, at 40° C. for 2 minutes, and was then washed with water. Subsequently, the cloth was dipped for 5 minutes in fluoroboric acid having an acid concentration of 0.1N, held at 30° C. and then washed with water. Next, the cloth was dipped for 5 minutes in an electroless copper plating solution containing 7.5 g/L of copper sulfate, 30 ml/L of 37% formalin, and 5 g/L of Rochelle salt, held at 30° C. and then washed with water. Next, the cloth was dipped at a current density of 5 $A/dm^2$ for 10 minutes into an electric nickel plating solution of pH 3.7 containing 300 g/L of nickel sulfamate, 30 g/L of boric acid, and 15 g/L of nickel chloride, and held at 35° C., to laminate nickel onto the cloth, followed by washing with water. 10 $g/m^2$ of copper and 4 $g/m^2$ of nickel were plated onto the cloth. The weight of the resultant metal-coated cloth was 64 $g/m^2$.

A sealing solution of the following Formulation 1 was applied to one surface of the metal-coated cloth by means of a knife and was then dried at 130° C. for 1 minute. The amount of the sealing solution applied was 4 $g/m^2$ in terms of a solids content. Next, a mixed treating solution of the following Formulation 2 for forming a flame-retardant film was applied to the same surface by means of a knife and was then dried at 130° C. for 2 minutes. The amount of the mixed treating solution applied was 150 $g/m^2$ in terms of a solids content.

Formulation 1

| | |
|---|---|
| TOA ACRON SA-6218 (acrylic resin, solids content 18%, a product of TOHPE CORP.) | 100 parts |
| RESAMINE UD crosslinking agent (isocyanate crosslinking agent, solids content 75%, a product of Dainichiseika Colour & Chemicals Mfg. Co.) | 1.5 parts |
| Toluene | proper amount |

The viscosity was adjusted to 15000 cps by adjusting the amount of toluene added.

Formulation 2

| | |
|---|---|
| Melamine polyphosphate (P content 13%, N content 43%) | 15 parts |
| Aluminium hydroxide | 60 parts |
| Bisphenol A bis(diphenyl phosphate) | 22.5 parts |
| Ester type urethane resin | 30 parts |
| Dimethyl formamide | 120 parts |
| Methyl ethyl ketone | proper amount |

The viscosity was adjusted to 8000 cps by adjusting the amount of methyl ethyl ketone added.

Example 2

A sealing solution of the following Formulation 3 was applied by means of a knife to one surface of a metal-coated cloth which had been plated in the same way as in Example 1 and was then dried at 130° C. for 1 minutes. The amount of the sealing solution applied was 6 $g/m^2$ in terms of a solids content. Next, a mixed treating solution of the following Formulation 4 for forming a flame-retardant film was applied to the same surface by means of a knife and was then dried at 130° C. for 2 minutes. The amount of the mixed treating solution applied was 130 $g/m^2$ in terms of a solids content.

Formulation 3

| | |
|---|---|
| TOA ACRON SA-6218 (acrylic resin, solids content 18%, a product of TOHPE CORP.) | 100 parts |
| RESAMINE UD crosslinking agent (isocyanate crosslinking agent, solids content 75%, a product of Dainichiseika Colour & Chemicals Mfg. Co.) | 1.5 parts |
| Cyclic phenoxyphosphazene (P content 13%, N content 6%) | 8.5 parts |
| Tricresyl phosphate | 2.5 parts |
| Toluene | proper amount |

The viscosity was adjust to 18000 cps by adjusting the amount of toluene added.

Formulation 4

| | |
|---|---|
| Cyclic phenoxyphosphazene (P content 13%, N content 6%) | 18 parts |

-continued

| | |
|---|---|
| Melamine polyphosphate (P content 13%, N content 43%) | 15 parts |
| Aluminium hydroxide | 60 parts |
| Tricresyl phosphate | 7.5 parts |
| Ester type urethane resin | 30 parts |
| Dimethyl formamide | 112 parts |
| Methyl ethyl ketone | proper amount |

The viscosity was adjusted to 8000 cps by adjusting the amount of methyl ethyl ketone added.

Example 3

The sealing solution of Formulation 3 was applied by means of a knife to one surface of a metal-coated cloth which had been plated in the same way as in Example 1 and was then dried at 130° C. for 1 minute. The amount of the sealing solution applied was 6 g/m$^2$ in terms of a solids content. Next, the mixed treating solution of Formulation 2 for forming a flame-retardant film was applied to the opposite surface by means of a knife and was then dried at 130° C. for 2 minutes. The amount of the mixed treating solution applied was 150 g/m$^2$ in terms of a solids content.

Example 4

A sealing solution of the following Formulation 5 was applied by means of a knife to one surface of a metal-coated cloth which had been plated in the same way as in example 1 and was then dried at 130° C. for 1 minute. The amount of the sealing solution applied was 5 g/m$^2$ in terms of a solids content. Next, a mixed treating solution of the following Formulation 6 for forming a flame-retardant film was applied to the same surface by means of a knife and was then dried at 130° C. for 2 minutes. The amount of the mixed treating solution applied was 120 g/m$^2$ in terms of a solids content.

Formulation 5

| | |
|---|---|
| CRISVON 2116EL (urethane resin, solids content 30%, a product of Dainippon Ink And Chemicals, Incorporated) | 100 parts |
| RESAMINE UD crosslinking agent (isocyanate crosssIinking agent, solids content 75%, a product of Dainichiseika Colour & Chemicals Mfg. Co.) | 1.5 parts |
| Dimethyl formamide | proper amount |

The viscosity was adjusted to 8000 cps by adjusting the amount of dimethyl formamide added.

Formulation 6

| | |
|---|---|
| Melamine polyphosphate (P content 13%, N content 43%) | 7.5 parts |
| Aluminium hydroxide | 75 parts |
| Titanium dioxide | 7.5 parts |
| Bisphenol A bis(diphenyl phosphate) | 22.5 parts |
| Ester type urethane resin | 30 parts |
| Dimethyl formamide | 110 parts |
| Toluene | 10 parts |
| Methyl ethyl ketone | proper amount |

The viscosity was adjusted to 8000 cps by adjusting the amount of methyl ethyl ketone added.

Example 5

The sealing solution of Formulation 5 was applied by means of a knife to one surface of a metal-coated cloth which had been plated in the same way as in Example 1 and was then dried at 130° C. for 1 minute. The amount of the sealing solution applied was 5 g/m$^2$ in terms of a solids content. Next, the mixed treating solution of Formulation 6 for forming a flame-retardant film was applied to the opposite surface by means of a knife and was then dried at 130° C. for 2 minutes. The amount of the mixed treating solution applied was 120 g/m$^2$ in terms of a solids content.

Example 6

A polyester fiber cloth (woven:warp 56 dtex/36 f, weft 56 dtex/36 f, warp density 175 pc/in, weft density 132 pc/in) was treated in the same way as in Example 1 and was thereby plated 12 g/m$^2$ of copper and 5 g/m$^2$ of nickel to afford a metal-coated cloth having a weight of 75 g/m$^2$. Next, a mixed treating solution of the following Formulation 7 for forming a flame-retardant film was applied to one surface of the metal-coated cloth by means of a knife and was then dried at 130° C. for 2 minutes. The amount of the mixed treating solution applied was 135 g/m$^2$ in terms of a solids content.

Formulation 7

| | |
|---|---|
| Melamine polyphosphate (P content 13%, N content 43%) | 7.5 parts |
| Aluminium hydroxide | 75 parts |
| Titanium dioxide | 7.5 parts |
| Bisphenol A bis(diphenyl phosphate) | 22.5 parts |
| Ester type urethane resin | 30 parts |
| Dimethyl formamide | 110 parts |
| Toluene | 10 parts |
| Methyl ethyl ketone | proper amount |

The viscosity was adjusted to 20000 cps by adjusting the amount of methyl ethyl ketone added.

Comparative Example 1

The sealing solution of Formulation 1 was applied by means of a knife to one surface of a metal-coated cloth which had been plated in the same way as in Example 1 and was then dried at 130° C. for 1 minute. The amount of the sealing solution applied was 4 g/m$^2$ in terms of a solids content. Next, a mixed treating solution of the following Formulation 8 for forming a flame-retardant film was applied to the same surface by means of a knife and was then dried at 130° C. for 2 minutes. The amount of the mixed treating solution applied was 150 g/m$^2$ in terms of a solids content.

Formulation 8

| | |
|---|---|
| Melamine polyphosphate (P content 13%, N content 43%) | 45 parts |
| Bisphenol A bis(diphenyl phosphate) | 10 parts |
| Ester type urethane resin | 30 parts |
| Dimethyl formamide | 115 parts |
| Methyl ethyl ketone | proper amount |

The viscosity was adjusted to 8000 cps by adjusting the amount of methyl ethyl ketone added.

Comparative Example 2

The sealing solution of Formulation 1 was applied by means of a knife to one surface of a metal-coated cloth which had been plated in the same way as in Example 1 and was then dried at 130° C. for 1 minute. The amount of the sealing solution applied was 4 g/m² in terms of a solids content. Next, a mixed treating solution of the following Formulation 9 for forming a flame-retardant film was applied to the same surface by means of a knife and was then dried at 130° C. for 2 minutes. The amount of the mixed treating solution applied was 250 g/m² in terms of a solids content.

Formulation 9

| | |
|---|---|
| Aluminium hydroxide | 300 parts |
| Bisphenol A bis(diphenyl phosphate) | 10 parts |
| Ester type urethane resin | 30 parts |
| Dimethyl formamide | 115 parts |
| Methyl ethyl ketone | proper amount |

The viscosity was adjusted to 8000 cps by adjusting the amount of methyl ethyl ketone added.

Comparative Example 3

The sealing solution of Formulation 1 was applied by means of a knife to one surface of a metal-coated cloth which had been plated in the same way as in Example 1 and was then dried at 130° C. for 1 minute. The amount of the sealing solution applied was 4 g/m² in terms of a solids content. Next, a mixed treating solution of the following Formulation 10 for forming a flame-retardant film was applied to the same surface by means of a knife and was then dried at 130° C. for 2 minutes. The amount of the mixed treating solution applied was 150 g/m² in terms of a solids content.

Formulation 10

| | |
|---|---|
| Cyclic phenoxyphosphazene (P content 13%, N content 6%) | 10 parts |
| Melanine polyphosphate (P content 13%, N content 43%) | 10 parts |
| Aluminium hydroxide | 40 parts |
| Tricresyl phosphate | 30 parts |
| Ester type urethane resin | 60 parts |
| Dimethyl formamide | 100 parts |
| Methyl ethyl ketone | proper amount |

The viscosity was adjusted to 8000 cps by adjusting the amount of methyl ethyl ketone added.

Comparative Example 4

The sealing solution of Formulation 1 was applied by means of a knife to one surface of a metal-coated cloth which had been plated in the same way as in Example 1 and was then dried at 130° C. for 1 minute. The amount of the sealing solution applied was 4 g/m² in terms of a solids content. Next, a mixed treating solution of the following Formulation 11 for forming a flame0retardant film was applied to the same surface by means of a knife and was then dried at 130° C. for 2 minutes. The amount of the mixed treating solution applied was 150 g/m² in terms of a solids content.

Formulation 11

| | |
|---|---|
| Decabromodiphenyl oxide | 45 parts |
| Antimony trioxide | 25 parts |
| Tricresyl phosphate | 15 parts |
| Ester type urethane resin | 30 parts |
| Dimethyl formamide | 85 parts |
| Methyl ethyl ketone | proper amount |

The viscosity was adjusted to 8000 cps by adjusting the amount of methyl ethyl ketone added.

The products obtained in the above Examples and Comparative Examples were evaluated for performance, the results of which are shown in Table 1.

TABLE 1

| | Flame Retardancy | Rigidity/ Softness (mm) | Surface Conductivity (Ω/□) Longitudinal | Surface Conductivity (Ω/□) Transverse | Electromagnetic Wave Shielding Property (dB) 10 MHz | Electromagnetic Wave Shielding Property (dB) 1 GHz | Bonding Strength between Flame-retardant Film and Metal-coated Cloth (N/in) | Bonding Strength between Adhesive Tape and Flame-retardant Metal-coated Cloth (N/in) | Thickness (μm) | Remarks |
|---|---|---|---|---|---|---|---|---|---|---|
| Example 1 | Acceptable | 54 | 0.05 | 0.05 | 98 | 80 | 10 | 11 | 240 | |
| Example 2 | Acceptable | 45 | 0.05 | 0.05 | 98 | 80 | 10 | 11 | 220 | |
| Example 3 | Acceptable | 55 | 0.05 | 0.05 | 98 | 80 | 15 | 3 | 240 | |
| Example 4 | Acceptable | 42 | 0.05 | 0.05 | 98 | 80 | 18 | 11 | 230 | |
| Example 5 | Acceptable | 45 | 0.05 | 0.05 | 98 | 80 | 15 | 8 | 230 | |
| Example 6 | Acceptable | 84 | 0.05 | 0.05 | 98 | 80 | 15 | 11 | 245 | |
| Comparative Example 1 | Unacceptable | 54 | 0.05 | 0.05 | 98 | 80 | 10 | 11 | 240 | |
| Comparative Example 2 | Acceptable | 92 | 0.05 | 0.05 | 98 | 80 | 10 | 11 | 290 | |
| Comparative Example 3 | Unacceptable | 55 | 0.05 | 0.05 | 98 | 80 | 10 | 11 | 240 | |
| Comparative Example 4 | Acceptable | 55 | 0.05 | 0.05 | 98 | 80 | 10 | 11 | 240 | A halogen compound and an antimony compound were used. |

According to Examples 1 to 6, as is apparent from Table 1, flame-retardant metal-coated cloths having a high degree of flame retardancy and a soft feeling could be obtained without using any halogen compound or antimony compound. In Example 2, by adding a flame retardant to the sealing resin, the required flame retardancy and softness could be satisfied although the weight of the flame-retardant film formed on the sealing resin was small. In Example 4, by using a urethane resin as the sealing resin, the adhesion between the flame-retardant film formed on the urethane resin and the metal-coated cloth could be improved. This is presumed to be because the compatibility is improved by using the same type of a sealing resin as the thermoplastic resin (urethane resin) contained in the flame-retardant film. In Example 5, since a urethane resin high in film strength was used as the sealing resin applied to the opposite surface of the flame-retardant film, in comparison with Example 3 using an acrylic resin low in film strength, the adhesion between an adhesive tape and the flame-retardant metal-coated cloth was improved and the metal-coated cloth was found preferable in its use as an electromagnetic wave shielding material in a mounted state to an electronic device. In Example 6, by using a high density cloth and by increasing the viscosity of the mixed treating solution used for forming a flame-retardant film, there could be obtained a flame-retardant metal-coated cloth without the application of a sealing resin.

On the other hand, in Comparative Example 1 not using a metal hydroxide and Comparative Example 3 wherein the ratio of phosphorus compound, metal hydroxide, phosphoric ester and thermoplastic resin was outside the specific range defined herein, it was impossible to satisfy the flame retardancy. In Comparative Example 2 not using a phosphorus compound and containing a large amount of a metal hydroxide, the feeling became extremely hard and the product obtained was difficult to handle and could not withstand a practical use although the flame retardancy was satisfied. Comparative Example 4 using a halogen compound and an antimony compound was not considered preferable when safety to the environment and to the human body was taken into account although it was satisfactory in point of flame retardancy and softness.

What is claimed is:

1. A flame-retardant metal-coated cloth, comprising:

a metal-coated cloth having a first surface and a second surface, the metal coated cloth comprising a synthetic fiber; and a flame-retardant coating provided over the first surface;

wherein the flame-retardant coating comprises a mixture (E) of a phosphorous compound (A), aluminum hydroxide (B), a phosphoric ester (C), and a thermoplastic resin (D), characterized in that the ratio of (A):(B):(C):(D) is 20 to 200:100 to 400:10 to 250:100 in terms of a weight ratio, wherein the weight of the flame-retardant coating formed by the mixture (E) is 100 to 300% by weight based on the weight of the metal-coated cloth, wherein the flame-retardant coating does not include a halogen compound or an antimony compound, wherein the thermoplastic resin is capable of dissolving in benzene, toluene, xylene, methyl ethyl ketone or dimethyl formamide to form the coating solution having a viscosity of 3000 to 25000 cps, wherein the flame-retardant metal-coated cloth has a thickness of 100 to 300 μm, wherein the flame-retardant metal-coated cloth has an acceptable VTM-0 flame retardancy when the flame-retardant metal-coated cloth is evaluated in accordance with UL94, VTM-0 Testing Method, wherein the flame-retardant metal-coated cloth has a rigidity/softness value of 42 mm to 84 mm measured by a 45° Cantilever Method in accordance with JIS-L-1096.

2. A flame-retardant metal cloth according to claim 1, wherein the phosphorus compound (A) contains phosphorus and nitrogen as constituent elements, with the phosphorus content being in the range of 10 to 15 weight percent of compound (A), and the ratio of phosphorus to nitrogen in (A) is 1:0.3 to 4.

3. A flame-retardant metal-coated cloth claim 2, wherein the phosphorous compound (A) is at least one member selected from the group consisting of internal mixing phosphazene compound and melamine polyphosphates.

4. A flame-retardant metal-coated cloth according to claim 1, wherein the metal hydroxide (B) is at least one member selected from the group consisting of aluminum hydroxide and magnesium hydroxide.

5. A flame-retardant metal-coated cloth according to claim 1, wherein the phosphoric ester (C) is at least one orthophosphoric ester.

6. A flame-retardant metal-coated cloth according to claim 1, wherein the thermoplastic resin (D) is at least one member selected from the group consisting of urethane resins, acrylic resins, and polyester resins.

7. The flame-retardant metal-coated cloth according to claim 1, wherein another coating of a sealing solution is formed between the metal-coated cloth and the flame-retardant film.

8. A flame-retardant metal-coated cloth according to claim 1, wherein the ratio of (A):(B):(C):(D) is 30 to 150:100 to 400:10 to 100:100.

9. A flame-retardant metal-coated cloth according to claim 1, wherein the flame-retardant metal-coated cloth further comprises another coating made of a sealing solution formed before the flame-retardant coating is formed either on the first surface or the second surface.

10. A flame-retardant metal-coated cloth according to claim 1, wherein the phosphorous compound is an internal mixing phosphazene compound.

11. A flame-retardant metal-coated cloth according to claim 1, wherein the phosphorous compound is a melamine polyphosphate.

* * * * *